United States Patent
Boyd et al.

(10) Patent No.: US 7,526,624 B2
(45) Date of Patent: *Apr. 28, 2009

(54) APPARATUS AND METHOD TO ADJUST DATA TRANSFER RATE

(75) Inventors: Kenneth W. Boyd, Tucson, AZ (US);
Kirby G. Dahman, Tucson, AZ (US);
Kenneth F. Day, II, Tucson, AZ (US);
Philip M. Doatmas, Tucson, AZ (US);
John J. Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,952

(22) Filed: Oct. 31, 2007

(65) Prior Publication Data

US 2008/0065849 A1    Mar. 13, 2008

Related U.S. Application Data

(63) Continuation of application No. 11/531,249, filed on Sep. 12, 2006, now Pat. No. 7,321,960, which is a continuation of application No. 10/652,021, filed on Aug. 29, 2003, now Pat. No. 7,107,420.

(51) Int. Cl.
*G06F 12/16* (2006.01)
*G06F 15/16* (2006.01)

(52) U.S. Cl. ................ 711/162; 711/167; 709/230

(58) Field of Classification Search .............. None
See application file for complete search history.

(56) References Cited

U.S. PATENT DOCUMENTS

| 7,107,420 B2 * | 9/2006 | Boyd et al. ........... 711/162 |
| 7,321,960 B2 * | 1/2008 | Boyd et al. ........... 711/162 |
| 7,370,089 B2 * | 5/2008 | Boyd et al. ........... 709/219 |
| 2005/0021591 A1 * | 1/2005 | Boyd et al. ........... 709/200 |

* cited by examiner

*Primary Examiner*—Denise Tran
(74) *Attorney, Agent, or Firm*—Dale F. Regelman; Quarles & Brady LLP

(57) ABSTRACT

A method to optimize the transmission of data from (N) primary backup appliances interconnected to a plurality of second backup appliances by a single communication link, wherein (N) is greater than 1, by transferring a data set to one or more secondary backup appliances by two or more of the (N) primary backup appliances using the communication link, and completing those transfers of the data sets by the two or more primary backup appliances at the same time.

11 Claims, 7 Drawing Sheets

APPARATUS AND METHOD TO ADJUST DATA TRANSFER RATE

CROSS-REFERENCE TO RELATED APPLICATIONS

This Application is a Continuation Application claiming priority from a U.S. Utility application having Ser. No. 11/531,249 filed Sep. 12, 2006 now U.S. Pat. No. 7,321,960, which is a Continuation Application claiming priority from the U.S. Utility application having Ser. No. 10/652,021 filed Aug. 29, 2003 now U.S. Pat. No. 7,107,420.

FIELD OF THE INVENTION

This invention relates to an apparatus and method to adjust the data transfer rate used by each of a plurality of backup appliances.

BACKGROUND OF THE INVENTION

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track.

Having a backup data copy is mandatory for many businesses for which data loss would be catastrophic. The time required to recover lost data is also an important recovery consideration. With tape or library backup, primary data is periodically backed-up by making a copy on tape or library storage.

In addition, protection is required for recovering data if the entire system or even the site is destroyed by a disaster such as an earthquake, fire, explosion, hurricane, etc. Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers.

The secondary site must not only be sufficiently remote from the primary site, but must also be able to backup primary data in real time. The secondary site needs to backup primary data in real time as the primary data is updated, with some minimal delay. A difficult task required of the secondary site is that the secondary data must be "order consistent," that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

In certain data processing applications, information is provided to one or more primary backup appliances which form one or more consistent transactions sets. Those one or more primary backup appliances are generally located at or near the primary storage site. Periodically, each of the one or more primary backup appliances provides via a common communication link all or a part of a consistent transactions set to one or more secondary backup appliances located at the one or more remote storage sites. What is needed is a method to autonomically adjust the data transfer rate of each of a plurality of backup appliances to maximally utilize the available data transfer bandwidth of the common communication link.

SUMMARY OF THE INVENTION

Applicants' invention includes an apparatus and method to optimize the transmission of data from (N) primary backup appliances interconnected to a plurality of second backup appliances by a single communication link, wherein (N) is greater than 1. The method transfers a data set to one or more secondary backup appliances by two or more of the (N) primary backup appliances using the communication link, and completes those transfers of the data sets by the two or more primary backup appliances at the same time.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements.

Figure 4:
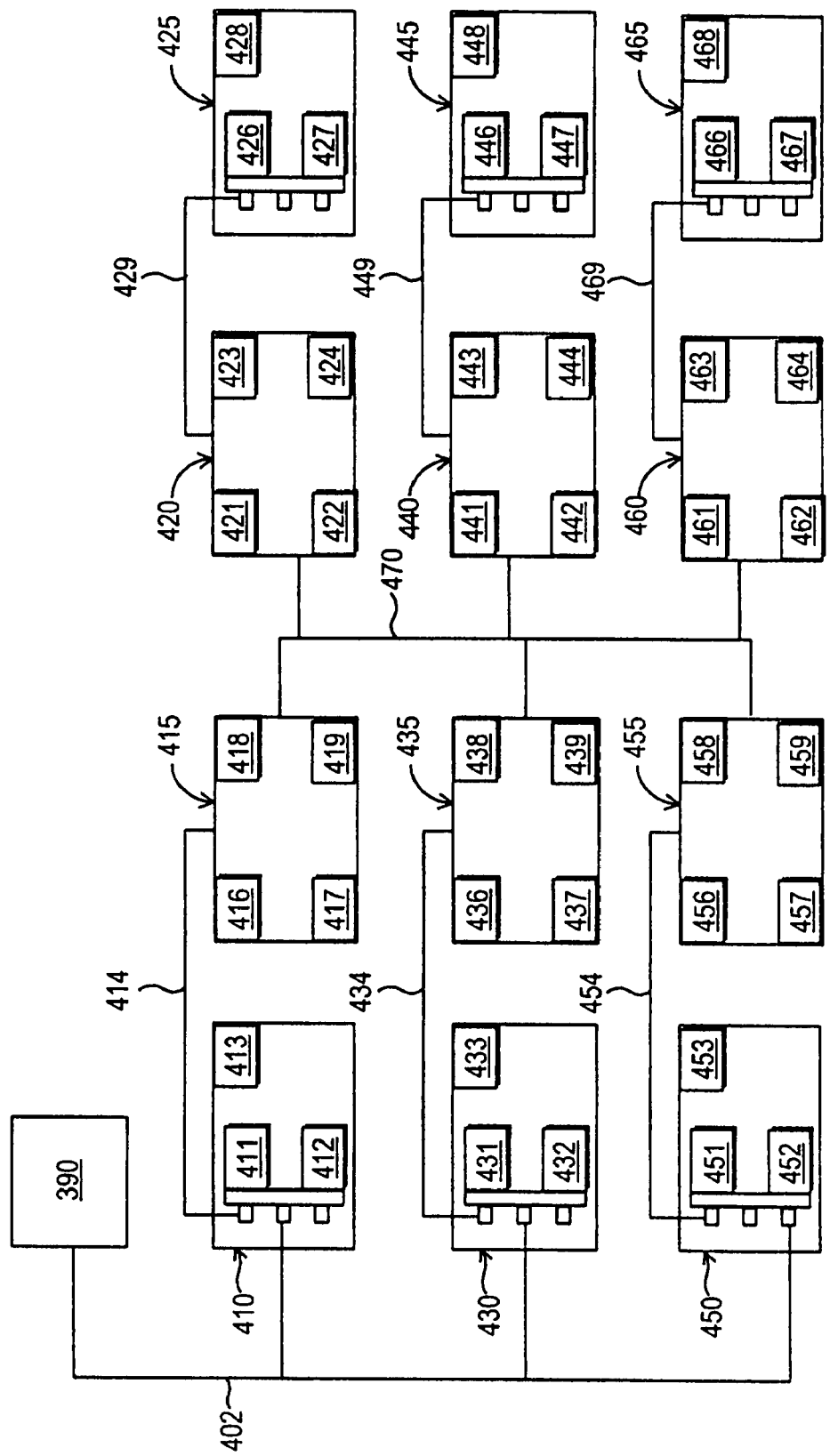
FIG. 4 is a block diagram showing the components of Applicants' remote copy data storage and retrieval system.

FIG. 4 shows the components of Applicants' system. Referring now to FIG. 4, host computer 390 is interconnected to, and communicates with, primary data storage and retrieval systems 410, 430, and 450, via communication link 402. In certain embodiments, communication link 402 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary data storage and retrieval system 410 provides information from primary information storage medium 413 to secondary data storage and retrieval system 425 for copying to secondary information storage medium 428, via primary backup appliance 415 and secondary backup appliance 420. Primary backup appliance 415 comprises computer readable medium 418 having computer readable code disposed therein to adjust the data transfer rate using the steps recited in FIGS. 5, 6, and/or 7. Secondary backup appliance 420 comprises computer readable medium 423 having computer readable code disposed therein to adjust the data transfer rate using the steps recited in FIGS. 5, 6, and/or 7.

Information storage and retrieval system 410 further includes a controller 411, and optionally a data cache 412. Information storage and retrieval system 425 further includes a controller 426, and optionally a data cache 427.

In certain embodiments, information storage medium 413 comprises a DASD. In certain embodiments, information storage medium 413 comprises one or more RAID arrays. In certain embodiments, information storage medium 413 comprises a plurality of portable information storage media, including for example a plurality of magnetic tapes, individually disposed in a portable container, such as for example a tape cartridge.

In certain embodiments, information storage medium 428 comprises a DASD. In certain embodiments, information storage medium 428 comprises one or more RAID arrays. In certain embodiments, information storage medium 428 comprises a plurality of portable information storage media, including for example a plurality of magnetic tapes, individually disposed in a portable container, such as for example a tape cartridge.

In certain embodiments, primary backup appliance 415 is integral with primary data storage and retrieval system 410. In the illustrated embodiment of FIG. 4, primary backup appliance 415 is external to primary data storage and retrieval system 410, and communicates with primary data storage and retrieval system 410 via communication link 414. In certain embodiments, communication link 414 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, secondary backup appliance 420 is integral with secondary data storage and retrieval system 425. In the illustrated embodiment of FIG. 4, secondary backup appliance 420 is external to secondary data storage and retrieval system 425, and communicates with secondary data storage and retrieval system 425 via communication link 429. In certain embodiments, communication link 429 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary data storage and retrieval system 430 provides information from primary information storage medium 433 to secondary data storage and retrieval system 445 for copying to secondary information storage medium 448, via primary backup appliance 435 and secondary backup appliance 440. Primary backup appliance 435 comprises computer readable medium 438 having computer readable code disposed therein to adjust the data transfer rate using the steps recited in FIGS. 5, 6, and/or 7. Secondary backup appliance 440 comprises computer readable medium 443 having computer readable code disposed therein to adjust the data transfer rate using the steps recited in FIGS. 5, 6, and/or 7.

Information storage and retrieval system 430 further includes a controller 431, and optionally a data cache 432. Information storage and retrieval system 445 further includes a controller 446, and optionally a data cache 447.

In certain embodiments, information storage medium 433 comprises a DASD. In certain embodiments, information storage medium 433 comprises one or more RAID arrays. In certain embodiments, information storage medium 433 comprises a plurality of portable information storage media, including for example a plurality of magnetic tapes, individually disposed in a portable container, such as for example a tape cartridge.

In certain embodiments, information storage medium 448 comprises a DASD. In certain embodiments, information storage medium 448 comprises one or more RAID arrays. In certain embodiments, information storage medium 448 comprises a plurality of portable information storage media, including for example a plurality of magnetic tapes, individually disposed in a portable container, such as for example a tape cartridge.

In certain embodiments, primary backup appliance 435 is integral with primary data storage and retrieval system 430. In the illustrated embodiment of FIG. 4, primary backup appliance 435 is external to primary data storage and retrieval system 430, and communicates with primary data storage and retrieval system 430 via communication link 434. In certain embodiments, communication link 434 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, secondary backup appliance 440 is integral with secondary data storage and retrieval system 445. In the illustrated embodiment of FIG. 4, secondary backup appliance 440 is external to secondary data storage and retrieval system 445, and communicates with secondary data storage and retrieval system 445 via communication link 449. In certain embodiments, communication link 449 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary data storage and retrieval system 450 provides information from primary information storage medium 453 to secondary data storage and retrieval system 465 for copying to secondary information storage medium 468, via primary backup appliance 455 and secondary backup appliance 460. Primary backup appliance 455 comprises computer readable medium 458 having computer readable code disposed therein to adjust the data transfer rate using the steps recited in FIGS. 5, 6, and/or 7. Secondary backup appliance 460 comprises computer readable medium 463 having computer readable code disposed therein to adjust the data transfer rate using the steps recited in FIGS. 5, 6, and/or 7.

Information storage and retrieval system 450 further includes a controller 451, and optionally a data cache 452. Information storage and retrieval system 465 further includes a controller 466, and optionally a data cache 467.

In certain embodiments, information storage medium 453 comprises a DASD. In certain embodiments, information storage medium 453 comprises one or more RAID arrays. In certain embodiments, information storage medium 453 comprises a plurality of portable information storage media, including for example a plurality of magnetic tapes, individually disposed in a portable container, such as for example a tape cartridge.

In certain embodiments, information storage medium 468 comprises a DASD. In certain embodiments, information storage medium 468 comprises one or more RAID arrays. In certain embodiments, information storage medium 468 comprises a plurality of portable information storage media, including for example a plurality of magnetic tapes, individually disposed in a portable container, such as for example a tape cartridge.

In certain embodiments, primary backup appliance 455 is integral with primary data storage and retrieval system 450. In the illustrated embodiment of FIG. 4, primary backup appliance 455 is external to primary data storage and retrieval system 450, and communicates with primary data storage and retrieval system 450 via communication link 454. In certain embodiments, communication link 454 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, secondary backup appliance 460 is integral with secondary data storage and retrieval system 465. In the illustrated embodiment of FIG. 4, secondary backup appliance 460 is external to secondary data storage and retrieval system 465, and communicates with secondary data storage and retrieval system 465 via communication link 469. In certain embodiments, communication link 469 is selected from the group consisting of a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary backup appliances 415, 435, and 455, receive information from primary data storage and retrieval systems 410, 430, and 450, respectively. Alternatively, any primary backup appliance could receive information from any primary data storage and retrieval system. Periodically, each primary backup appliance forms a consistent transactions set. By "consistent transactions set," Applicants mean a set of transactions for which when all of the transactions in the set are applied at the secondary data storage and retrieval system controller, the secondary storage will look identical to the primary storage at the point-in-time that the set was created.

Figure 1:
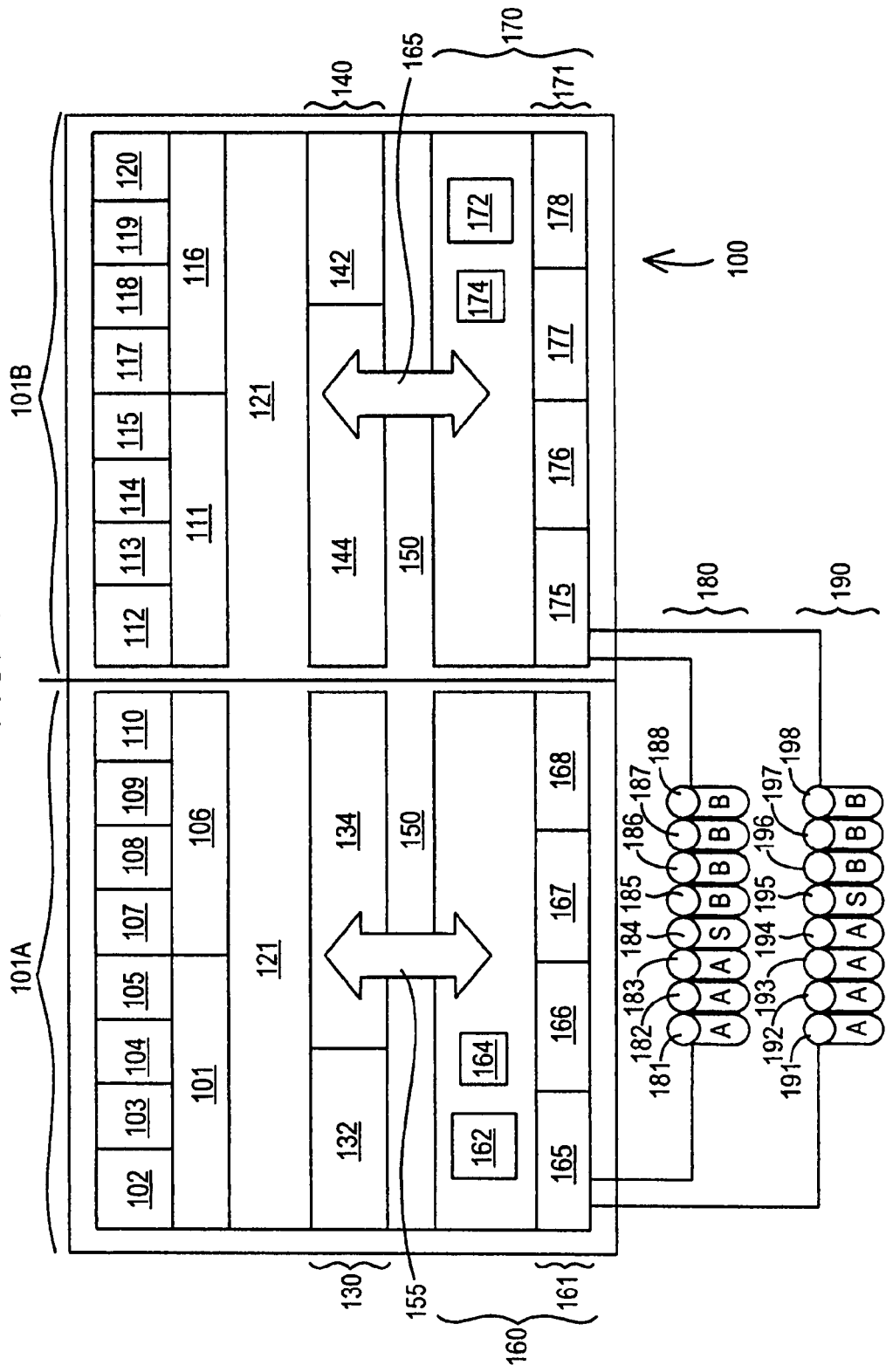
FIG. 1 is a block diagram showing the components of one embodiment of Applicants' data storage and retrieval system.

In certain embodiments, one or more of data storage and retrieval systems 410, 425, 430, 445, 450, and/or 465, comprise data storage and retrieval system 100 (FIG. 1). Referring now to FIG. 1. Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one Fibre Channel port, one FICON port, two ESCON ports, or two SCSI ports. Each host adapter is connected to both clusters through one or more Common Platform Interconnect buses 121 and 150 such that each cluster can handle I/O from any host adapter.

Processor portion 130 includes processor 132 and cache 134. In certain embodiments, processor 132 comprises a 64-bit RISC based symmetric multiprocessor. In certain embodiments, processor 132 includes built-in fault and error-correction functions. Cache 134 is used to store both read and write data to improve performance to the attached host systems. In certain embodiments, cache 134 comprises about 4 gigabytes. In certain embodiments, cache 134 comprises about 8 gigabytes. In certain embodiments, cache 134 comprises about 12 gigabytes. In certain embodiments, cache 144 comprises about 16 gigabytes. In certain embodiments, cache 134 comprises about 32 gigabytes.

Processor portion 140 includes processor 142 and cache 144. In certain embodiments, processor 142 comprises a 64-bit RISC based symmetric multiprocessor. In certain embodiments, processor 142 includes built-in fault and error-correction functions. Cache 144 is used to store both read and write data to improve performance to the attached host systems. In certain embodiments, cache 144 comprises about 4 gigabytes. In certain embodiments, cache 144 comprises about 8 gigabytes. In certain embodiments, cache 144 comprises about 12 gigabytes. In certain embodiments, cache 144 comprises about 16 gigabytes. In certain embodiments, cache 144 comprises about 32 gigabytes.

I/O portion 160 includes non-volatile storage ("NVS") 162 and NVS batteries 164. NVS 162 is used to store a second copy of write data to ensure data integrity should there be a power failure of a cluster failure and the cache copy of that data is lost. NVS 162 stores write data provided to cluster 101B. In certain embodiments, NVS 162 comprises about 1 gigabyte of storage. In certain embodiments, NVS 162 comprises four separate memory cards. In certain embodiments, each pair of NVS cards has a battery-powered charging system that protects data even if power is lost on the entire system for up to 72 hours.

I/O portion 170 includes NVS 172 and NVS batteries 174. NVS 172 stores write data provided to cluster 101A. In certain embodiments, NVS 172 comprises about 1 gigabyte of storage. In certain embodiments, NVS 172 comprises four separate memory cards. In certain embodiments, each pair of NVS cards has a battery-powered charging system that protects data even if power is lost on the entire system for up to 72 hours.

In the event of a failure of cluster 101B, the write data for the failed cluster will reside in the NVS 162 disposed in the surviving cluster 101A. This write data is then destaged at high priority to the RAID ranks. At the same time, the surviving cluster 101A will begin using NVS 162 for its own write data thereby ensuring that two copies of write data are still maintained.

I/O portion 160 further comprises a plurality of device adapters, such as device adapters 165, 166, 167, and 168, and sixteen disk drives organized into two RAID ranks, namely RAID rank "A" and RAID rank "B". In certain embodiments, RAID ranks "A" and "B" utilize a RAID 5 protocol. In certain embodiments, RAID ranks "A" and "B" utilize a RAID 10 protocol.

Figure 2:
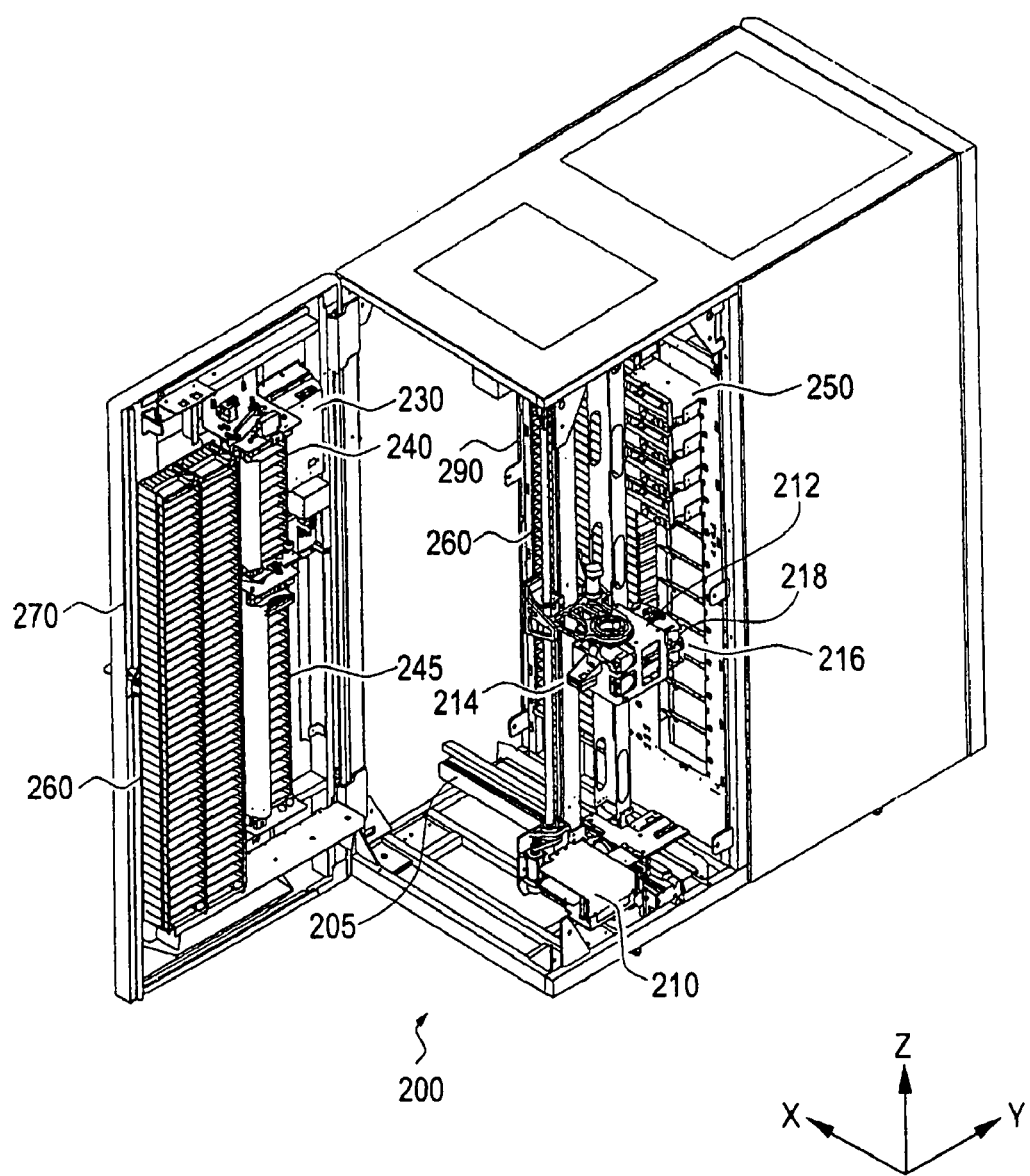
FIG. 2 is a block diagram showing the components of a second embodiment of Applicants' data storage and retrieval system.

In certain embodiments, one or more of data storage and retrieval systems 410, 425, 430, 445, 450, and/or 465, comprise data storage and retrieval system 200 (FIG. 2). FIG. 2 shows one embodiment of system 200.

System 200 is arranged for accessing portable data storage media in response to commands from one or more host systems, such as host computer 390 (FIG. 4). System 200 includes a plurality of storage shelves 260, on front wall 270 and rear wall 290, for storing portable data storage cartridges that contain data storage media. System 200 further includes at least one data storage drive 250 for reading and/or writing data with respect to the data storage media, and at least one accessor 210 for transporting the data storage media between the plurality of storage shelves 260 and the data storage drive(s) 250. System 200 may optionally comprise an operator panel 230 or other user interface, such as a web-based interface, which allows a user to interact with the library. System 200 may optionally comprise an upper import/export station 240 and/or a lower import/export station 245, which allows data storage media to be inserted into the library and/or removed from the library without disrupting library operation.

Accessor 210 comprises lifting servo section 212 which is capable of bidirectional movement along the Z axis. Accessor 210 further comprises at least one gripper assembly 216 for gripping one or more data storage media. In the illustrated embodiment of FIG. 2, accessor 210 further includes a bar code scanner 214 or other reading system, such as a smart card reader or similar system, to "read" identifying information about the data storage media. In the illustrated embodiment of FIG. 2, accessor 210 further includes a second gripper mechanism 218 disposed on lifting servo section 212.

In certain embodiments, system 200 comprises one or more storage frames, each having storage shelves 260 accessible by accessor 210. Accessor 210 moves bidirectionally along the X axis on rail 205. In embodiments of library 100 which comprise multiple frames, the rail 205 in each of those individual frames are aligned such that accessor 210 may travel from one end of the library to the opposite end along a contiguous rail system.

Figure 3:
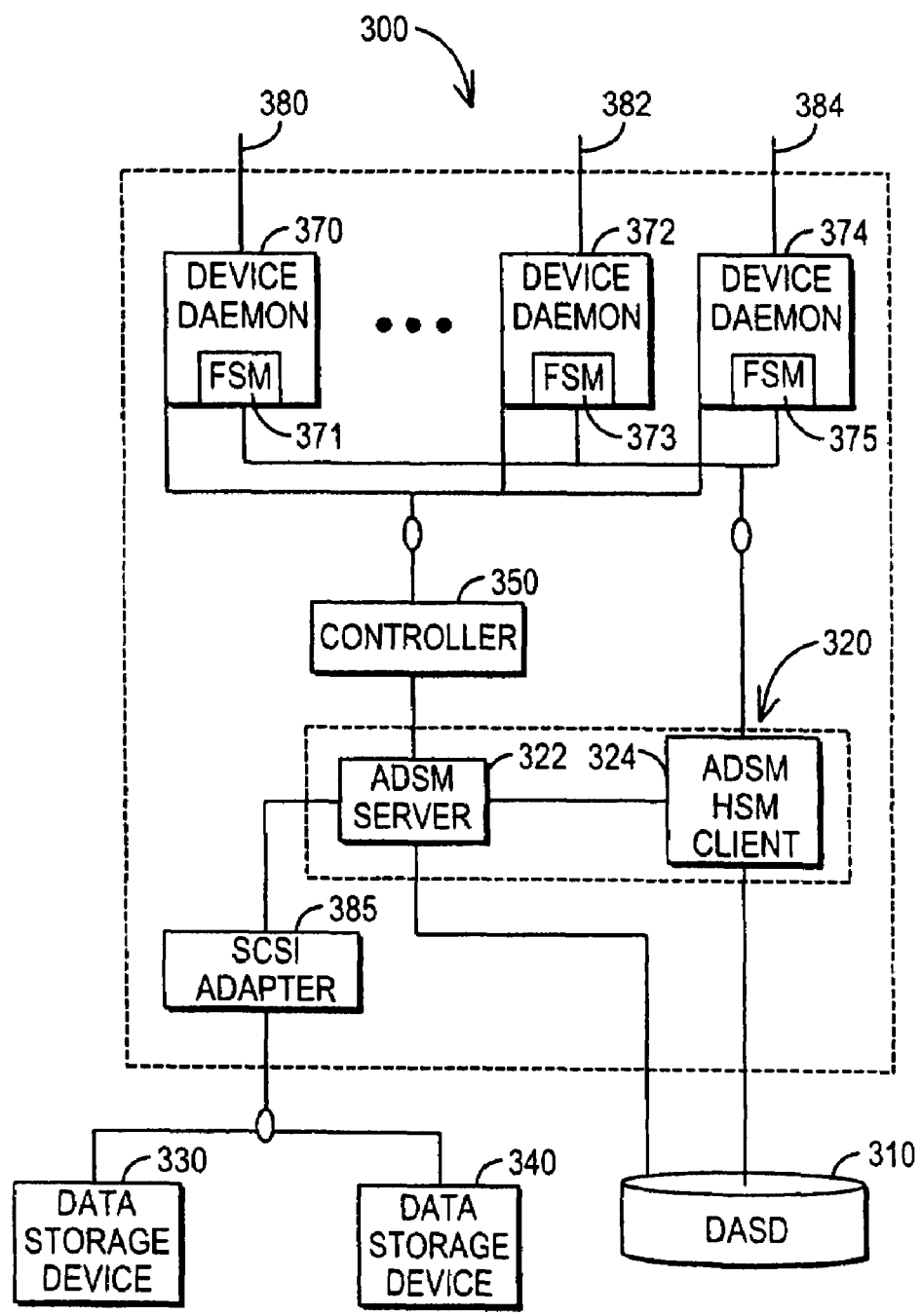
FIG. 3 is a block diagram showing the components of a third embodiment of Applicants' data storage and retrieval system.

In certain embodiments, one or more of data storage and retrieval systems 410, 425, 430, 445, 450, and/or 465, comprise data storage and retrieval system 300 (FIG. 3). Referring now to FIG. 3, virtual tape server 300 ("VTS") 300 communicates with one or more hosts and with one or more virtual tape servers via daemons 370, 372, and 374. In the illustrated embodiment of FIG. 3, daemon 370 communicates with a first host via communication link 380. In the illustrated embodiment of FIG. 3, daemon 372 communicates with a second host via communication link 382. Daemon 374 communicates with, for example, a primary backup appliance, such as appliance 415, via communication link 384.

VTS 300 also communicates with direct access storage device (DASD) 310, a plurality of data storage devices 330 and 340. In certain embodiments, data storage devices 330 and 340 are disposed within one or more data storage and retrieval systems. In certain embodiments, DASD 310 is integral with host 110 (FIG. 1). In certain embodiments, DASD 310 is integral with VTS 300. In certain embodiments, DASD 310 is integral with a data storage and retrieval system. In certain embodiments, DASD 310 is external to host 110, VTS 300, and the one or more data storage and retrieval systems in communication with VTS 300.

VTS 300 further includes storage manager 320, such as the IBM Adstar® Distributed Storage Manager. Storage manager 320 controls the movement of data from DASD 310 to information storage media mounted in data storage devices 330 and 340. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 330 and 340 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140.

Referring again to FIG. 4, each primary backup appliance receives data from various different primary storage controllers at different rates than the other primary backup appliances. This being the case, the size of the consistent transaction sets formed by the primary backup appliances may vary widely. Pending patent application having Ser. No. 10/339,957, entitled "Method, System, and Article of Manufacture for Creating a Consistent Copy," now, U.S. Pat. No. 7,089,446 and assigned to the common assignee hereof, describes a method to form consistent transaction sets, and is hereby incorporated by reference in its entirety.

The primary backup appliances, such as appliances 415, 435, and 455, each provide a consistent transactions set to their corresponding secondary backup appliances, such as appliances 420, 440, and 460, respectively, via a common communication link, such as communication link 470. In certain embodiments, communication link 470 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In order to optimize the transmission of data from a plurality of primary backup appliances, such as primary appliances, 415, 435, and 455, to a plurality of secondary backup appliances, such as appliances 420, 440, and 460, the bandwidth of communication link 470 should remain fully utilized. In certain embodiments, no single primary backup appliance can fully utilize the bandwidth of the common communication link, i.e. communication link 470. In these embodiments, it is desirable that more than one primary backup appliance utilize the communication link when providing consistent transaction sets to one or more secondary backup appliances.

In addition, it is desirable that each of the primary backup appliances complete transfer of consistent transaction sets at approximately the same time because these transfers take place on a set by set basis. Therefore, there is no advantage for one primary backup appliance to complete the transfer of consistent transaction sets before the remaining primary appliances complete their transfer of consistent transaction sets.

If the time to complete ("TTC") transfer of consistent transaction sets for a first primary backup appliance exceeds the TTC for the remaining primary backup appliances because that first appliance was not allocated sufficient bandwidth of communication link 470, such differing TTCs could adversely impact the rate at which the secondary backup appliances provide information to the secondary data storage and retrieval systems. Using Applicants' method each of the primary backup appliances autonomically adjust its TTC using the common communication link interconnecting each of those primary backup appliances with the plurality of secondary backup appliances.

Figure 5:
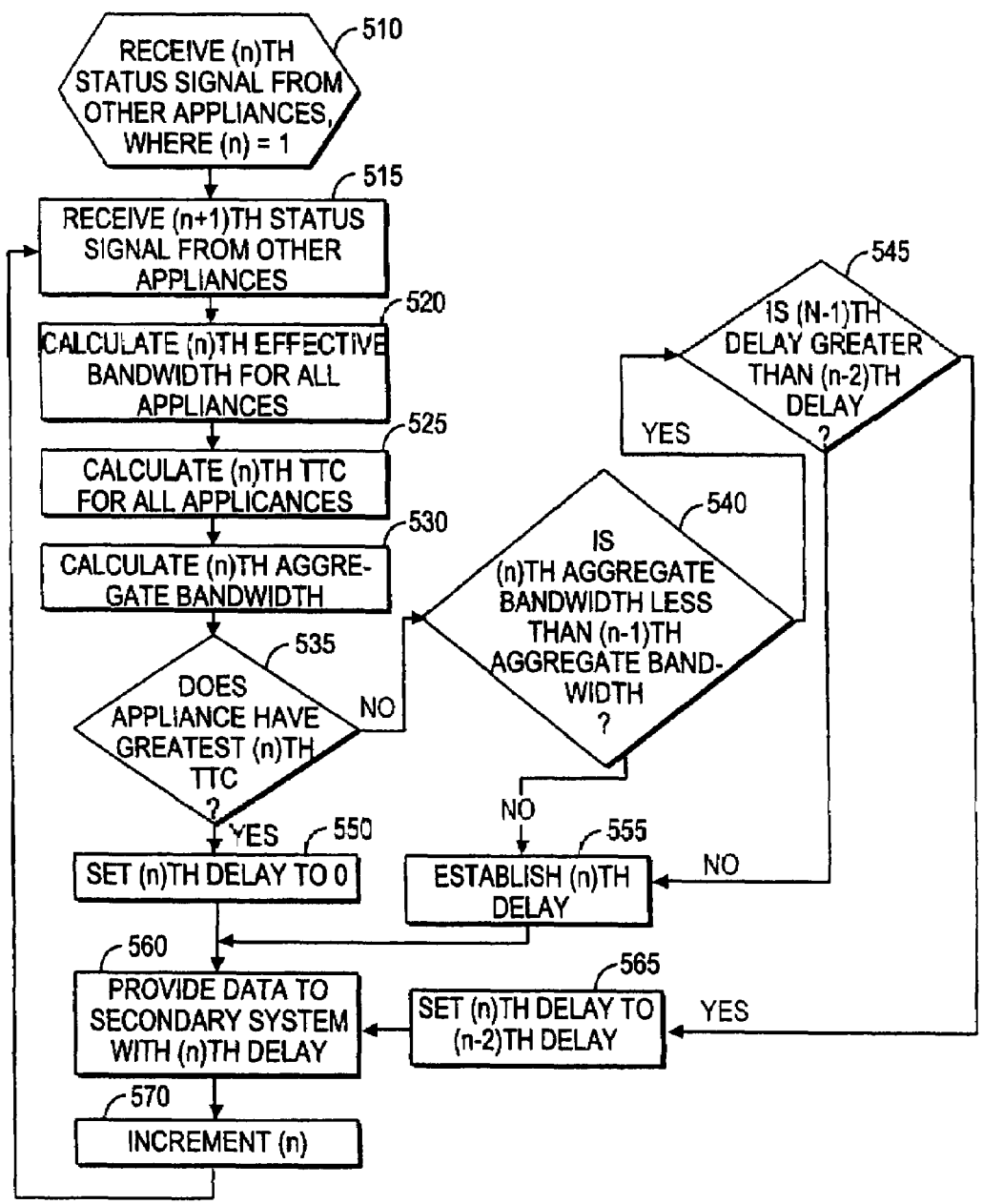
FIG. 5 is a flow chart summarizing certain initial steps in Applicants' method.

Applicants' invention includes a method to autonomically adjust the data transfer rate of each primary backup appliance in Applicants' system. FIG. 5 summarizes the steps of Applicants' method to autonomically adjust the data transfer rate of each of (N) primary backup appliances. For descriptive purposes, the steps of FIGS. 5, 6, and, 7 are described below as being performed by one primary backup appliance, i.e. a first primary appliance. In implementation, the steps of FIGS. 5, 6, and/or 7, are independently, i.e. autonomically, performed by each of the (N) primary backup appliances.

Referring now to FIG. 5, in step 510 the first primary backup appliance receives a status signal from each of the remaining (N−1) primary backup appliances. Each primary backup appliance, including the first primary backup appliance, periodically sends a status signal, sometimes referred to as a "heart beat" signal, to each of the other primary backup appliances.

Each of these status signals comprises the (n)th amount of information for transmission to one or more secondary backup appliances via a common communication link, such as communication link 470 (FIG. 4) interconnecting the (N) primary backup appliances with each of the secondary backup appliances.

The (n)th amount of information reported by each primary backup appliance in its (n)th status signal comprises a fixed amount of data. In certain embodiments, the (n)th amount of information comprises at least one consistent transactions set. In certain embodiments, the (n)th amount of information comprises a portion of at least one consistent transactions set.

Applicants' method transitions from step 510 to step 515 wherein the first primary backup appliance receives a next status signal, i.e. the (n+1)th status signal, from each of the remaining (N−1) primary backup appliances. Each of those (n+1)th status signals includes the (n+1)th amount of information for transmission to one or more secondary backup appliances via a common communication link.

The (n+1)th amount of information of step 515 comprises a fixed amount of data. The (n+1)th amount of information of step 515 is typically less than the (n)th amount of information of step 510. In the event the first primary backup appliance did not provide any data to the one or more secondary backup appliances in the interval between the (n)th status signal and the (n+1)th status signal, then the (n+1)th amount of information equals the (n)th amount of information.

Applicants' method transitions from step 515 to step 520 wherein the first primary backup appliance calculates the (n)th effective bandwidth for each of the (N) appliances. The first primary backup appliance can determine its (n)th effective bandwidth by dividing the amount of information sent to one or more secondary appliances by the time interval over which that information was sent. The first primary backup appliance determines the (n)th effective bandwidth for each of the remaining (N−1) appliances by dividing the respective differences between the (n)th amount of information and the (n+1)th amount of information, for each of the remaining primary appliances, by the status signal interval time.

Applicants' method transitions from step 520 to step 525 wherein the first primary backup appliance calculates a time to completion ("TTC") for each of the (N) primary backup appliances. The TTC value of step 525 comprises the time, for each of the (N) primary backup appliances, required to send to the one or more secondary backup appliances the remaining amount of information using the (n)th effective bandwidth of step 520. Step 525 includes, for each of the (N) appliances, dividing the (n+1)th amount of information by the (n)th effective bandwidth of step 520.

Applicants' method transitions from step 525 to step 530 wherein the first primary backup appliance calculates the (n)th aggregate bandwidth for all (N) primary backup appliances. As those skilled in the art will appreciate, step 530 includes averaging the (N) values for each (n)th individual bandwidths of step 520.

Applicants' method transitions from step 530 to step 535 wherein the method determines if the first primary backup appliance has the greatest (n)th TTC time among the (N) primary backup appliances. If the Applicants' method determines in step 535 that the first primary backup appliance has the greatest (n)th TTC time of the (N) primary backup appliances, then Applicants' method transitions from step 535 to step 550 wherein the method sets the (n)th delay for the first primary backup appliance to 0. Applicants' method transitions from step 550 to step 560 wherein the method provides, by the first primary backup appliance, data comprising all or part of its consistent transactions set to one or more secondary backup appliances via a common communication link using the (n)th delay.

By providing data "using the (n)th delay," Applicants mean each appliance sends a fixed amount of data comprising all or part of that appliance's consistent transaction set. After sending that data, each appliance then "sleeps" for its (n)th delay value. This process is repeated until the (n)th delay value changes or the data for this consistent transactions set has all been sent.

If Applicants' method determines in step 535 that the first primary backup appliance does not have the greatest TTC time of the (N) primary backup appliances, then Applicants' method transitions from step 535 to step 540 wherein the method determines if the (n)th aggregate bandwidth is less than the (n−1)th bandwidth. If Applicants' method determines in step 540 that the (n)th aggregate bandwidth is not less than the (n−1)th bandwidth, then Applicants' method transitions from step 540 to step 555 wherein the method establishes the (n)th delay for the first primary appliance. In the initial iteration of Applicants' method, i.e. where (n) is 1, there is no (n−1)th aggregate bandwidth. Thus, where (n) is 1, the determination of step 540 is necessarily "NO."

If Applicants' method determines in step 540 that the (n)th aggregate bandwidth is less than the (n−1)th bandwidth, then Applicants' method transitions from step 540 to step 545 wherein the method determines if the (n−1)th delay for the first primary backup appliance is greater than the (n−2)th delay for the first primary backup appliance. If Applicants' method determines in step 545 that the (n−1)th delay for the first primary backup appliance is greater than the (n−2)th delay for the first primary backup appliance, then Applicants' method transitions from step 545 to step 565 wherein the method sets the (n)th delay to the (n−2)th delay. Alternatively, if Applicants' method determines in step 545 that the (n−1)th delay for the first primary backup appliance is not greater than the (n−2)th delay for the first primary backup appliance, then Applicants' method transitions from step 545 to step 555.

As a first example, in the second iteration of Applicants' method, i.e. where (n) is 2, there can be no (n−2)th delay, therefore, where (n) is 2, the determination of step 545 is necessarily "NO", and the method transitions from step 545 to step 555. As a second example, if in the first iteration of Applicants' method, i.e. (n) is 1, a first delay is set for the first primary backup appliance, and using that first delay Applicants' system provides data at a first aggregate bandwidth. Thereafter in the second iteration, i.e. n is 2, the delay for the first primary backup appliance is increased, and using that second delay for the first primary backup appliance Applicants' system provides data at a second aggregate bandwidth, where the second aggregate bandwidth is less than the first aggregate bandwidth. In the third iteration, i.e. (n) is 3, Applicants' method in step 545 returns a determination of "YES," and transitions to step 565 wherein the methods sets the third delay for the first primary backup appliance to the first delay value.

Steps 550, 555, and 565, transition to step 560 wherein the method provides data from the first primary backup appliance to one or more secondary backup appliances using the (n)th delay. Applicants' method transitions from step 560 to step 570 wherein the method increments (n). The method transitions from step 570 to step 515 and continues.

Figure 6:
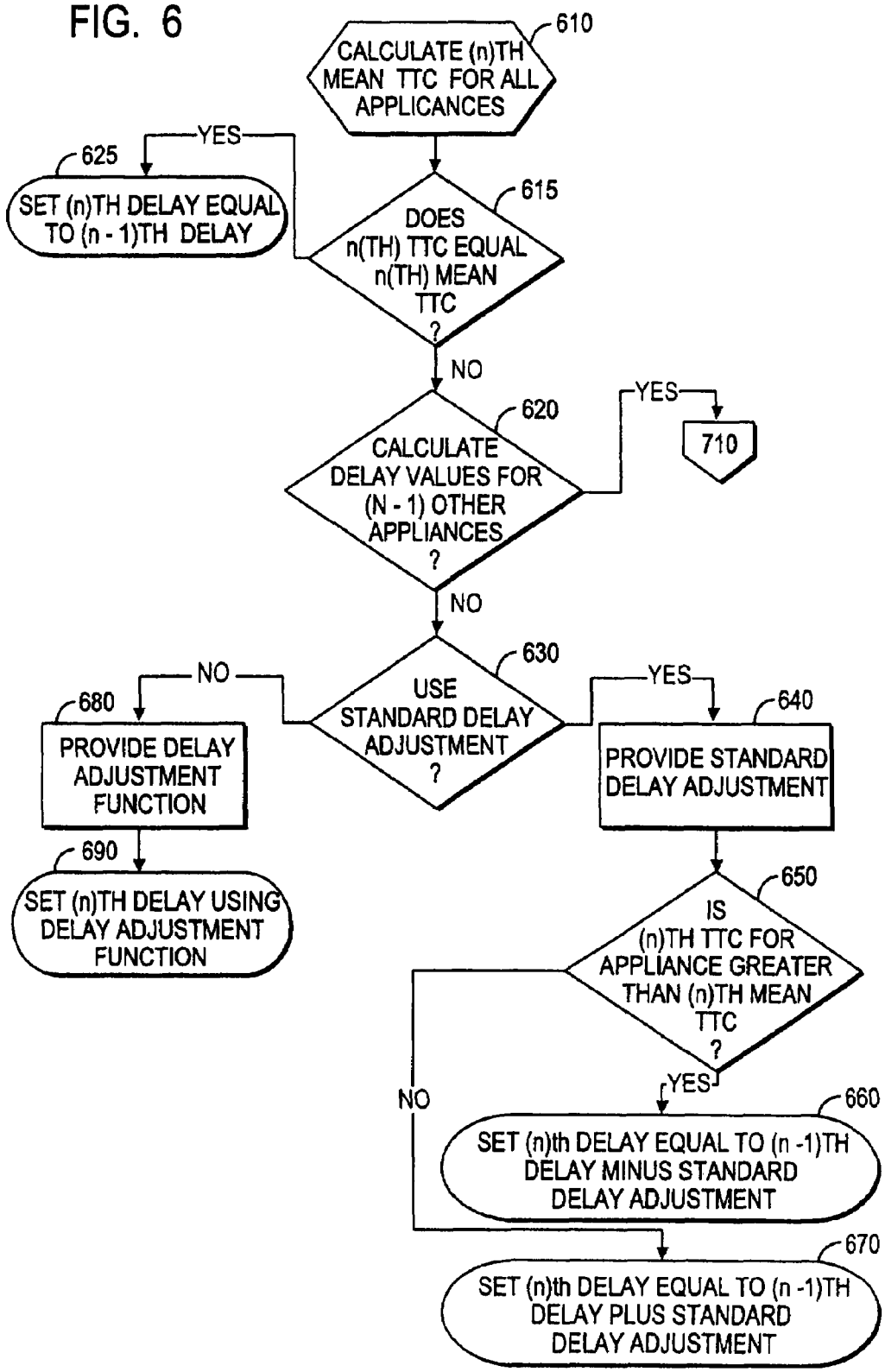
FIG. 6 is a flow chart summarizing certain additional steps in Applicants' method.

FIG. 6 summarizes the steps of two embodiments of Applicants' method to establish the (n)th delay in step 555 (FIG. 5). Referring now to FIG. 6, in step 610 Applicants' method calculates the (n)th mean TTC for all (N) primary backup appliances. In certain embodiments, step 610 is performed by the first primary backup appliance, such as primary backup appliance 415 (FIG. 4). In certain embodiments, step 610 is performed by a controller disposed in the first primary backup appliance, such as controller 417 (FIG. 4). As those skilled in the art will appreciate, step 610 includes determining the mean value for each of the (N) (n)th bandwidths determined in step 520 (FIG. 5).

Applicants' method transitions from step 610 to step 615 wherein the method determines if the (n)th TTC for the first primary backup appliance substantially equals the (n)th mean TTC for all appliances. By "substantially equal," Applicants mean differs by less than about plus or minus ten percent (10%). In certain embodiments, step 615 is performed by the first primary backup appliance, such as primary backup appliance 415 (FIG. 4). In certain embodiments, step 615 is performed by a controller disposed in the first primary backup appliance, such as controller 417 (FIG. 4).

If Applicants' method determines in step 615 that the (n)th TTC for the first primary backup appliance substantially equals the (n)th mean TTC for all appliances, then the method transitions from step 615 to step 625 wherein the method sets the (n)th delay for the first primary backup appliance equal to the (n−1)th delay for that appliance. In certain embodiments, step 625 is performed by the first primary backup appliance, such as primary backup appliance 415 (FIG. 4). In certain embodiments, step 625 is performed by a controller disposed in the first primary backup appliance, such as controller 417 (FIG. 4).

Figure 7:
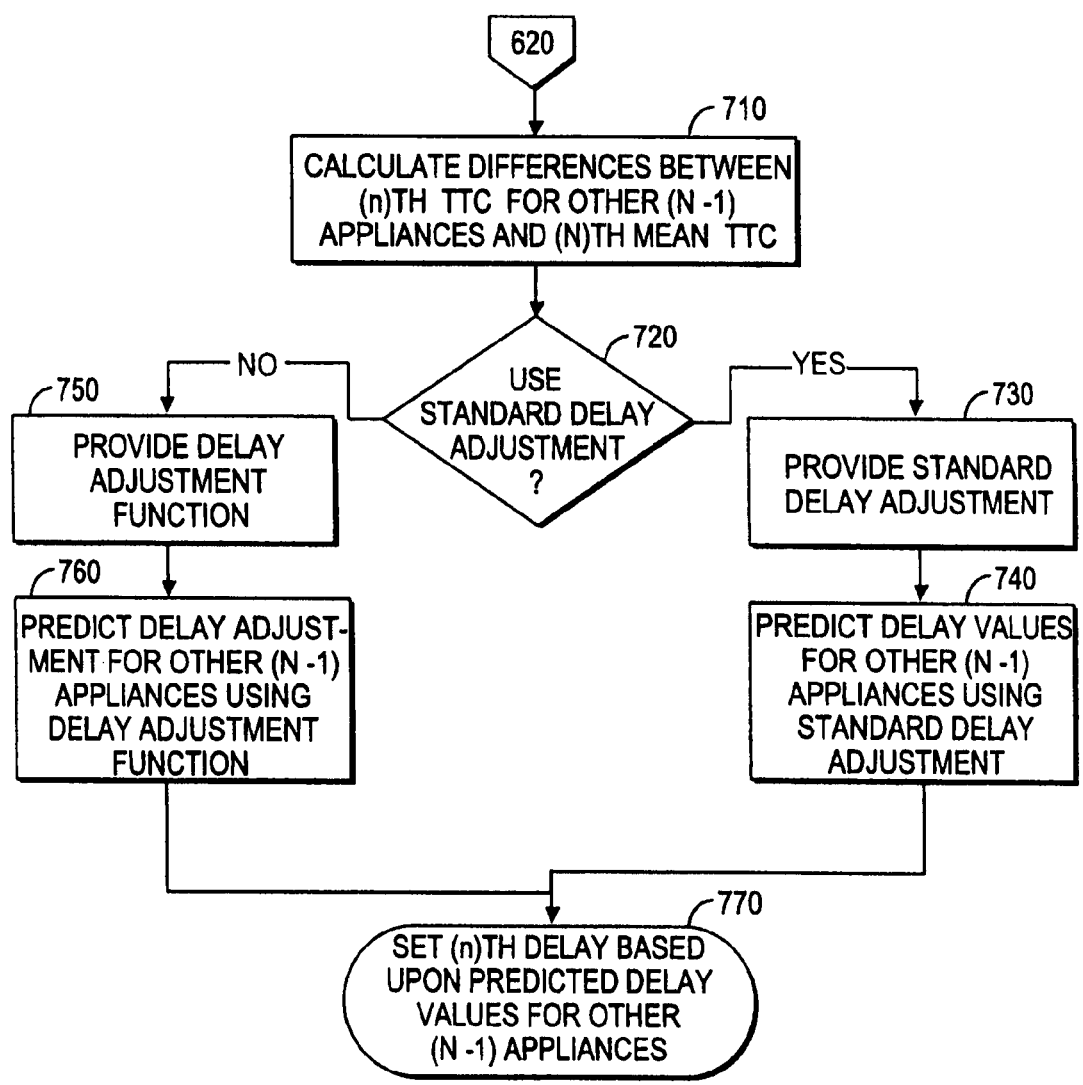
FIG. 7 is a flow chart summarizing certain additional steps in Applicants' method.

If Applicants' method determines in step 615 that the (n)th TTC for the first primary backup appliance does not substantially equal the (n)th mean TTC for all appliances, then the method transitions from step 615 to step 620 wherein the method determines whether to set the (n)th delay for the first primary backup appliance using predicted delay values for the remaining (N−1) appliances. In certain embodiments, step 620 is performed by the first primary backup appliance, such as primary backup appliance 415 (FIG. 4). In certain embodiments, step 620 is performed by a controller disposed in the first primary backup appliance, such as controller 417 (FIG. 4). If Applicants' method elects to set the (n)th delay for the first primary backup appliance using predicted delay values for the remaining (N−1) appliances, then the method transitions from step 620 to step 710 (FIG. 7).

The decision of step 620 is made based upon a policy decision previously made and implemented in firmware. In certain embodiments, that policy decision is made by the device manufacturer, and is implemented in firmware in the primary backup appliances at the time of manufacture. In certain embodiments, that policy decision is made by the system user, and is implemented in firmware in the primary backup appliances using, for example, an operator input station. In certain embodiments, such an operator input station is integral to the backup appliance. In certain embodiments, such as operator input station is integral with a data storage and retrieval system which is interconnected to the backup appliance. In certain embodiments, such an operator input station is external to both the backup appliance and to the one or more data storage and retrieval systems interconnected with that backup appliance.

Alternatively, if Applicants' method elects not to set the (n)th delay for the first primary backup appliance using predicted delay values for the remaining (N−1) appliances, then the method transitions from step 620 to step 630 wherein the method determines whether to use a standard delay adjustment. The decision of step 630 is made based upon a policy decision previously made and implemented in firmware. In certain embodiments, that policy decision is made by the device manufacturer, and is implemented in firmware in the primary backup appliances at the time of manufacture. In certain embodiments, that policy decision is made by the system user, and is implemented in firmware in the primary backup appliances using, for example, an operator input station. In certain embodiments, such an operator input station is integral to the backup appliance. In certain embodiments, such as operator input station is integral with a data storage and retrieval system which is interconnected to the backup appliance. In certain embodiments, such an operator input station is external to both the backup appliance and to the one or more data storage and retrieval systems interconnected with that backup appliance.

If Applicants' method elects not to use a standard delay adjustment in step 630, then the method transitions from step 630 to step 680. If Applicants' method elects to use a standard delay adjustment in step 630, then the method transitions from step 630 to step 640 wherein the method provides a standard delay adjustment.

In certain embodiments, the standard delay adjustment of step 640 is set in firmware, such as firmware 416, disposed in the first primary backup appliance, such as primary backup appliance 415 (FIG. 4). In certain embodiments, the standard delay adjustment of step 640 is set in firmware disposed in a controller, such as controller 417, disposed in the first primary backup appliance, such as primary backup appliance 415 (FIG. 4). In certain embodiments, the standard delay adjustment of step 640 is set in firmware disposed in a controller, such as controller 411 (FIG. 4), disposed in a primary data storage and retrieval system, such as data storage and retrieval system 410 (FIG. 4). In certain embodiments, the standard delay adjustment of step 640 is provided by a host computer, such as host computer 390 (FIG. 3).

Applicants' method transitions from step 640 to step 650 wherein the method determines if the (n)th TTC for the first primary backup appliance is greater than the (n)th mean TTC of step 610. In certain embodiments, step 650 is performed by the first primary backup appliance, such as primary backup appliance 415 (FIG. 4). In certain embodiments, step 650 is performed by a controller disposed in the first primary backup appliance, such as controller 417 (FIG. 4).

If Applicants' method determines in step 650 that the (n)th TTC for the first primary backup appliance is greater than the (n)th mean TTC of step 610, then the method transitions from step 650 to step 660 wherein the method sets the (n)th delay for the first primary backup appliance to the (n−1)th delay for the first primary backup appliance minus the standard delay adjustment of step 630. In certain embodiments, step 660 is performed by the first primary backup appliance, such as primary backup appliance 415 (FIG. 4). In certain embodiments, step 660 is performed by a controller disposed in the first primary backup appliance, such as controller 417 (FIG. 4).

If Applicants' method determines in step 650 that the (n)th TTC for the first primary backup appliance is not greater than the (n)th mean TTC of step 610, then the method transitions from step 650 to step 670 wherein the method sets the (n)th delay for the first primary backup appliance to the (n−1)th delay for the first primary backup appliance plus the standard delay adjustment of step 630. In certain embodiments, step 670 is performed by the first primary backup appliance, such as primary backup appliance 415 (FIG. 4). In certain embodiments, step 670 is performed by a controller disposed in the first primary backup appliance, such as controller 417 (FIG. 4).

In the event there exists no (n−1)th delay, i.e. where (n) is 1, Applicants' method sets the (n)th delay for the first primary backup appliance to the standard delay adjustment.

If Applicants' method elects not to use a standard delay adjustment in step 630, then the method transitions from step 630 to step 680 wherein the method provides a delay adjustment function. In certain embodiments, the delay adjustment function of step 680 is provided by a host computer, such as host 390 (FIG. 3). In certain embodiments, the delay adjustment function of step 680 is set in firmware, such as firmware 416 (FIG. 4), disposed in the first primary backup appliance, such as primary backup appliance 415 (FIG. 4). In certain embodiments, the delay adjustment function of step 680 is set in firmware disposed a controller disposed in the first primary backup appliance, such as controller 417 (FIG. 4).

In certain embodiments, the delay adjustment function of step 680 comprises a look-up table comprising specific delay values for various differences between the (n)th mean TTC determined in step 610 and the (n)th TTC for the first primary backup appliance, i.e. $TTC_{agg} - TTC_{(I)}$. In certain embodiments, the delay adjustment function of step 680 comprises equation (1):

$$\text{Delay} = a(TTC_{agg} - TTC_{(I)}) + b \quad (1)$$

Applicants' method transitions from step 680 to step 690 wherein the method sets the (n)th delay using the delay adjustment function of step 680. In certain embodiments, step 680 is performed by the first primary backup appliance, such as primary backup appliance 415 (FIG. 4). In certain embodiments, step 680 is performed by a controller disposed in the first primary backup appliance, such as controller 417 (FIG. 4).

If Applicants' method elects in step 620 to set the (n)th delay for the first primary backup appliance using predicted delay values for the remaining (N−1) appliances, then the method transitions from step 620 to step 710 (FIG. 7). Referring now to FIG. 7, in step 710 Applicants' method calculates the difference between the (n)th mean TTC of step 610 and the (n)th TTC for each of the other (N−1) primary backup appliances. In certain embodiments, step 710 is performed by the first primary backup appliance, such as primary backup appliance 415 (FIG. 4). In certain embodiments, step 710 is performed by a controller disposed in the first primary backup appliance, such as controller 417 (FIG. 4).

In step 720, Applicants' method determines whether to use a standard delay adjustment to predict the delay values for the remaining (N−1) primary backup appliances. In certain embodiments, step 720 is performed by the first primary backup appliance, such as primary backup appliance 415 (FIG. 4). In certain embodiments, step 720 is performed by a controller disposed in the first primary backup appliance, such as controller 417 (FIG. 4).

The decision of step 720 is made based upon a policy decision previously made and implemented in firmware. In certain embodiments, that policy decision is made by the device manufacturer, and is implemented in firmware in the primary backup appliances at the time of manufacture. In certain embodiments, that policy decision is made by the system user, and is implemented in firmware in the primary backup appliances using, for example, an operator input station. In certain embodiments, such an operator input station is integral to the backup appliance. In certain embodiments, such as operator input station is integral with a data storage and retrieval system which is interconnected to the backup appliance. In certain embodiments, such an operator input station is external to both the backup appliance and to the one or more data storage and retrieval systems interconnected with that backup appliance.

If Applicants' method elects in step 720 to use a standard delay adjustment to predict the delay values for the remaining (N−1) primary backup appliances, then the method transitions from step 720 to step 730 wherein the method provides a standard delay adjustment. In certain embodiments, the standard delay adjustment of step 730 is set in firmware, such as firmware 416 (FIG. 4), disposed in the first primary backup appliance, such as primary backup appliance 415 (FIG. 4). In certain embodiments, the standard delay adjustment of step 730 is set in firmware disposed in a controller, such as controller 417, disposed in the first primary backup appliance, such as primary backup appliance 415 (FIG. 4). In certain embodiments, the standard delay adjustment of step 730 is set in firmware disposed in a controller, such as controller 411 (FIG. 4), disposed in a primary data storage and retrieval system, such as data storage and retrieval system 410 (FIG. 4). In certain embodiments, the standard delay adjustment of step 730 is provided by a host computer, such as host computer 390 (FIG. 3).

Applicants' method transitions from step 730 to step 740 wherein the method predicts the delay values for the remaining (N−1) primary backup appliances using the standard delay adjustment of step 730. In certain embodiments, step 740 includes using steps 650 (FIG. 6), 660 (FIG. 6), and 670 (FIG. 6), for each of the other (N−1) primary backup appliances. In certain embodiments, step 740 is performed by the first primary backup appliance, such as primary backup appliance 415 (FIG. 4). In certain embodiments, step 740 is performed by a controller disposed in the first primary backup appliance, such as controller 417 (FIG. 4).

Applicants' method transitions from step 740 to step 770 wherein the method sets the (n)th delay for the first primary backup appliance using the predicted delay values of step 740. In certain embodiments, step 770 is performed by the first primary backup appliance, such as primary backup appliance 415 (FIG. 4). In certain embodiments, step 770 is performed by a controller disposed in the first primary backup appliance, such as controller 417 (FIG. 4).

If Applicants' method elects in step 720 not to use a standard delay adjustment to predict the delay values for the remaining (N−1) primary backup appliances, then the method transitions from step 720 to step 750 wherein the method provides a delay adjustment function. In certain embodiments, the delay adjustment function of step 750 comprises a look-up table comprising specific delay values for various differences between the (n)th mean TTC determined in step 610 (FIG. 6) and the (n)th TTC for the (i)th primary backup appliance, i.e. $TTC_{agg} - TTC_{(i)}$. In certain embodiments, the delay adjustment function of step 680 comprises a second order equation, such as equation (2):

$$\text{Delay} = a(TTC_{agg} - TTC_{(i)}) + b \quad (2)$$

Applicants' method transitions from step 750 to step 760 wherein the method predicts a delay value for each of the other (N−1) primary backup appliances using the delay adjustment function of step 750. Applicants' method transitions from step 760 to step 770.

In certain embodiments, individual steps recited in FIGS. 5, 6, and/or 7, may be combined, eliminated, or reordered.

Applicants' invention further includes an article of manufacture comprising a computer usable medium, such as for example computer usable media 418, 423, 438, 443, 458, and/or 463, having computer readable program code disposed therein to adjust the data transfer rate using the steps recited in FIGS. 5, 6, and/or 7.

Applicants' invention further includes a computer program product, such as for example computer program product 419, 424, 439, 444, 459, and/or 464, usable with a programmable computer processor having computer readable program code to adjust the data transfer rate using the steps recited in FIGS. 5, 6, and/or 7. In certain embodiments, the computer program product is disposed in a data storage and retrieval system. In certain embodiments, the computer program product is disposed in a backup appliance. In certain embodiments, the computer program code implements the steps of FIGS. 5, 6, and/or 7.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to optimize the transmission of data from a plurality of primary backup appliances, comprising the steps of:
    supplying (N) primary backup appliances interconnected to a plurality of second backup appliances by a single communication link, wherein (N) is greater than 1;
    transferring a data set to one or more secondary backup appliances by two or more of said (N) primary backup appliances using said communication link;
    completing said transfers of said data sets by said two or more primary backup appliances at the same time;
    calculating a (n)th effective bandwidth for each of said (N) primary backup appliances; wherein (n) is greater than or equal to 1;
    calculating a time to complete for each of said (N) primary backup appliances;
    calculating an effective aggregate bandwidth for each of said (N) primary appliances;
    determining if a first primary backup appliance has a greatest (n)th time to complete among the (N) primary backup appliances;
    operative if said first primary backup appliance has a greatest (n)th time to complete among the (N) primary backup appliances:
    setting a (n)th delay to 0;
    providing all or part of at least one consistent transactions set from said first primary backup appliance to a first secondary backup appliance using said (n)th delay.

2. The method of claim 1, further comprising the steps of:
    receiving a standard delay adjustment;
    determining a (n)th mean time to complete for said (N) backup appliances;
    determining if the time to complete for said first primary backup appliance is greater than said (n)th mean time to complete;
    operative if said the (n)th time to complete for first primary backup appliance is greater than said (n)th mean time to complete, and operative if (n) is greater than 1, setting said (n)th delay for said first primary backup appliance equal to the (n−1)th delay for first primary backup appliance minus said standard delay adjustment.

3. The method of claim 2, further comprising the steps of:
    receiving a delay adjustment function;
    determining the difference between said (n)th mean time to complete and the (n)th time to complete for said first primary backup appliance;
    establishing the (n)th delay for said first primary backup appliance based upon said difference and said delay adjustment function.

4. The method of claim 2, further comprising the steps of:
    receiving a standard delay adjustment;
    predicting the (n)th delay for each of said (N−1) remaining primary backup appliances using said (n)th mean time to complete, the (n)th time to complete for each of the (N−1) remaining primary backup appliances, and said standard delay adjustment;
    establishing the (n)th delay for first primary backup appliance based upon the predicted delays for each of said (N−1) remaining primary backup appliances.

5. The method of claim 2, further comprising the steps of:
    receiving a delay adjustment function;
    predicting using said delay adjustment function (N−1) delay values, wherein each of said predicted delay values is associated with a different one of the remaining (N−1) primary backup appliances;
    establishing the (n)th delay for said first primary backup appliance based upon said (N−1) predicted delay values.

6. An article of manufacture comprising a computer readable medium having computer readable program code disposed therein to optimize the transmission of data from a first one of (N) primary backup appliances interconnected to a plurality of second backup appliances by a single communication link, wherein (N) is greater than 1, the computer readable program code comprising a series of computer readable program steps to effect:
    transferring by said first primary backup appliance a data set to one or more secondary backup appliances using said communication link, while at least one other of said (N) primary backup appliances transfers a data set to said one or more secondary backup appliances using said communication link;
    completing by said first primary backup appliance said transfer of said data set at the same time as said at least one other of said plurality of primary backup appliances completes a transfer of a data set;

calculating a (n)th effective bandwidth for each of said (N) primary backup appliances, wherein (n) is greater than or equal to 1;

calculating a (n)th time to complete for each of said (N) primary backup appliances;

calculating a (n)th effective aggregate bandwidth for all (N) primary appliances;

determining if said first primary backup appliance has a greatest (n)th time to complete among the (N) primary backup appliances;

operative if said first primary backup appliance has a greatest (n)th time to complete among the (N) primary backup appliances:

setting a (n)th delay to 0;

providing all or part of at least one consistent transactions set from said first primary backup appliance to a first secondary backup appliance using said (n)th delay.

7. The article of manufacture of claim 6, said computer readable program code further comprising a series of computer readable program steps to effect:

determining the (n)th mean time to complete for all (N) primary backup appliances;

receiving a standard delay adjustment;

determining if the (n)th time to complete for said article of manufacture is greater than said (n)th mean time to complete;

operative if said the (n)th time to complete for said article of manufacture is greater than said (n)th mean time to complete, and operative if (n) is greater than 1, setting said (n)th delay for said article of manufacture equal to the (n−1)th delay for said article of manufacture minus said standard delay adjustment.

8. The article of manufacture of claim 6 said computer readable program code further comprising a series of computer readable program steps to effect:

determining the (n)th mean time to complete for all (N) primary backup appliances;

receiving a delay adjustment function;

determining the difference between said (n)th mean time to complete and the (n)th time to complete for said article of manufacture;

establishing the (n)th delay for said article of manufacture based upon said difference and said delay adjustment function.

9. The article of manufacture of claim 6 said computer readable program code further comprising a series of computer readable program steps to effect:

determining the (n)th mean time to complete for all (N) primary backup appliances;

receiving a standard delay adjustment;

predicting the (n)th delay for each of said (N−1) remaining primary backup appliances using said (n)th mean time to complete, the (n)th time to complete for each of the (N−1) remaining primary backup appliances, and said standard delay adjustment;

establishing the (n)th delay for the article of manufacture based upon the predicted delays for each of said (N−1) remaining primary backup appliances.

10. The article of manufacture of claim 6 said computer readable program code further comprising a series of computer readable program steps to effect:

receiving a delay adjustment function;

predicting using said delay adjustment function (N−1) delay values, wherein each of said predicted delay values is associated with a different one of the remaining (N−1) primary backup appliances;

establishing the (n)th delay for said article of manufacture based upon said (N−1) predicted delay values.

11. A computer program product embodied in a computer readable medium, and useable by a computer programmable processor disposed in a first one of (N) primary backup appliances interconnected to a plurality of second backup appliances by a single communication link, wherein (N) is greater than 1, comprising:

computer readable program code which causes said programmable computer processor to transfer a data set to one or more secondary backup appliances using said communication link, while at least one other of said (N) primary backup appliances transfers a data set to said one or more secondary backup appliances using said communication link;

computer readable program code which causes said programmable computer processor to complete said transfer of said data set at the same time as said at least one other of said (N) primary backup appliances completes a transfer of a data set;

computer readable program code which causes said programmable computer processor to calculate a (n)th effective bandwidth for each of said (N) primary backup appliances;

computer readable program code which causes said programmable computer processor to calculate a (n)th time to complete for each of said (N) primary backup appliances;

computer readable program code which causes said programmable computer processor to calculate a (n)th effective aggregate bandwidth for all (N) primary appliances;

computer readable program code which causes said programmable computer processor to determine if the (n)th time to complete for said first primary backup appliance is greater than the (n)th time to complete for each of the other (N−1) primary backup appliances;

computer readable program code which, if the (n)th time to complete for said first primary backup appliance is greater than the (n)th time to complete for each of the other (N−1) primary backup appliances, causes said programmable computer processor to provide all or part of at least one consistent transactions set to said first secondary backup appliance with no delay.

* * * * *